Feb. 11, 1964 W. S. BLUME, JR 3,121,131
METHOD OF IMPROVING THE ELASTICITY OF RUBBER BONDED MAGNETS
Filed May 26, 1961

CURED RUBBER BONDED
FINE PARTICLE PERMANENT
MAGNET MATERIAL

INVENTOR.
Walter S. Blume, Jr.
BY
Wood, Herron and Evans
ATTORNEYS

United States Patent Office 3,121,131
Patented Feb. 11, 1964

3,121,131
METHOD OF IMPROVING THE ELASTICITY OF RUBBER BONDED MAGNETS
Walter S. Blume, Jr., Cincinnati, Ohio, assignor to Leyman Corporation, Cincinnati, Ohio, a corporation of Ohio
Filed May 26, 1961, Ser. No. 112,868
8 Claims. (Cl. 264—104)

This invention relates to permanent magnets of the type comprising a plurality of discrete fine particles of a permanent magnet substance bonded together by a rubber or plastic matrix. More particularly, the invention relates to a method whereby the elasticity, flexibility, and coherency of such magnets may be greatly improved.

Rubber and plastic bonded permanent magnets are produced in increasingly large quantities. They are used in a great many ways, in place of conventional "bulk," or non-particulate, permanent magnets. Moreover, on account of unique properties which they possess which bulk magnets do not, they are often suitable where certain types of bulk magnets are unsuitable. They are not as hard and brittle as most high quality bulk magnet materials. They are cuttable and can be shaped by conventional forming techniques, for example, for punching, sawing, drilling, and edge cutting, whereas most high quality bulk magnets can be cut only by grinding. Their magnetic qualities and cost render them highly competitive with bulk magnets.

In the production of rubber bonded fine particle magnets, a bulk permanent magnet material, for example, barium ferrite, is ground or comminuted to fine particles. These particles preferably are of the order of size of ½ to 10 microns, but may be larger. Thus divided, the particles are dispersed in an elastomeric matrix by adding the particles to uncured rubber, for example, as it is being worked or masticated on a conventional two-roll rubber mill or banbury mill. Natural rubber is a commonly used matrix material on account of its workability and commercial availability. The ratio of magnetic material to matrix material, known as the loading factor, is usually relatively high, so that the magnetic material will be "diluted" as little as possible by the binder and will impart optimum magnetic qualities to the product. In practice, the finished magnet may comprise 90% or more by weight of magnetic material. (This figure may be contrasted with conventional "filled" rubber products wherein the rubber is admixed with a filler of clay or lamp black or the like, and wherein the filler usually comprises less than 25% of the weight of the mixture.)

As the magnetic particles and rubber are intimately mixed together, the rubber apparently flows into the interstices of the particles and fills the interparticle voids, so that the resulting mass, in spite of its large proportion of magnetic particles, is cohered or bonded together by the matrix. The matrix-particle intermixture is then formed into sheets, strips, or slabs, from which the final magnets are cut or formed. By means of the process disclosed in my co-pending application Serial No. 748,705, now Patent No. 2,999,275, entitled "Mechanical Orientation of Magnetically Anisotropic Particles," the material can be "aligned" as the intermixture is formed into such shapes, by which is meant that it is rendered more strongly magnetizable in one certain direction (called the "preferred magnetic direction") than in other directions. The matrix is then subjected to elevated temperatures and pressures whereby it is curved, set or hardened. Such matrix bonded magnet material is produced by Leyman Corporation, Magnetics Division, 5178 Crookshank Road, Cincinnati 38, Ohio, and is sold under the name "Plastiform."

It will be appreciated that on account of the high loading factor which is preferred in the manufacture of these materials, the product contains a relatively small proportion of binder or matrix, perhaps as low as 10% by weight. Because of the small fraction of matrix it contains, the material does not and indeed could hardly be expected to display properties of elasticity and flexibility comparable to those of cured unfilled rubber or conventional rubber products. In a sense it is odd that such materials are at all elastic and are not crumbly or brittle.

Thus, as previously mentioned, rubber and plastic bonded particle magnets are sufficiently coherent to withstand the stresses incidental to their use and conventional forming techniques. However, they are relatively inelastic and inflexible as compared with conventional filled rubber compounds, and are subject to checking, cracking or breaking if deformed beyond relatively narrow limits; although they are not nearly so brittle as bulk magnets, they cannot, for example, be bent into curved forms without breaking or cracking if their thickness is great in relation to the radius of curvature.

I have discovered a method whereby the elasticity, flexibility, and coherency of rubber or plastic bonded magnets may be greatly improved, by the practice of which such materials are caused to display elastic properties which approach the properties of conventional rubber products. Treated in accordance with this technique, rubber bonded fine particle magnet material becomes so flexible that it can actually be bent double upon itself without breaking and with very little checking or cracking. Strips of material can be stretched considerably from their original length without braking. Thick slabs of material can be bent into arcuate or circular form.

I have discovered that these improved properties can be imparted to rubber or plastic bonded particle magnet material simply by subjecting the material to reworking or rolling on a mill after it has been cured or set. More specifically, these improvements are effected by passing the cured or set material preferably a number of times between relatively rotating rolls which are spaced so that the nip between them is slightly less than the thickness of the material.

The manner whereby this technique effects the observed marked improvement in properties is not understood. It is surprising that any change whatsoever in properties is effected by this process since the matrix preferably has already been cured. Possibly there may be some chemical or physical change in the molecular structure of the rubber itself. In any event, a striking change in the elasticity of the rubber-particle mixture is apparent, even after a single pass between the rolls.

The spacing between the rolls does not appear to be highly critical in relation to the thickness of the material to be rolled between them. They must, of course, be spaced closely enough to exert more than just light pressure on the magnet material. Nip openings of about 95% of the thickness of the material have been found quite suitable.

Following is a specific example of the practice of the invention:

A commercially available rubber bonded permanent magnet material was subjected to processing in accordance with the invention. The particular material used was the previously identified Plastiform material. This material comprised about 65% by volume of ultra-fine particles (about 5 microns in diameter) of barium ferrite in a cured natural rubber matrix, the matrix comprising about 35% by volume of the material. By weight the material comprised about 90% ferrite particles. In the production of this material various additives, vulcanizing agents, accelerators, antioxidants, and the like had been added to the rubber, following conventional practice. The material displayed a preferred direction of magnetization in the direction normal or perpendicular to its surface.

Figure 1:
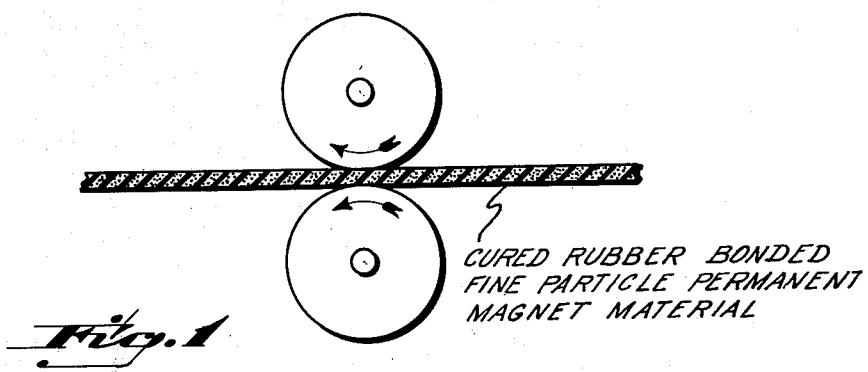
FIGURE 1 is a diagrammatic view showing a strip of cured rubber bonded fine particle permanent magnet material being passed between rolls to improve its elasticity in accordance with the process of the invention.

A slab of this material about ¼" thick was subjected to rolling between rolls spaced slightly less than ¼", in the manner illustrated in FIGURE 1. After a single pass between the rolls the slab demonstrated great improvement in elasticity and flexibility, and did not break even after repeated flexing, whereas a similar slab not so treated soon broke in two upon flexing. The slab so treated did not break even when bent double, although it did check. A thin strip (⅛" thick) of the same material could be stretched to roughly 3/2 of its original length without snapping, but an untreated strip of similar dimensions broke at very slight elongation. The rolling treatment did not unduly change the dimensions of the material, nor did it substantially affect its magnetic alignment.

The process I have discovered is of particular utility in connection with the production of curved magnets, for example, ring segment magnets of the type used in electric motors. In principle, ring segment magnets and the like can be produced from elastomer bonded fine particle magnet material by bending or reshaping a flat slab of material into the desired curved form. However, because of the tendency of untreated material to break or check upon bending, it has heretofore been virtually impossible to produce commercially acceptable curved magnets from such material.

By reason of the improvement in flexibility and coherency which is effected by the practice of the present process, at materials are rendered suitable for conversion into curved magnets.

Figure 2:
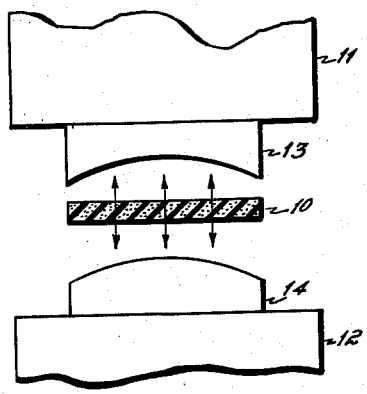
FIGURE 2 is a diagrammatic view of a press equipped with concave and convex dies between which is disposed a thick slab of perpendicularly aligned magnet material which has been treated in accordance with the process of the invention, and illustrates the manner in which such material may be manufactured into curved radially aligned ring segment magnets.
Figure 3:
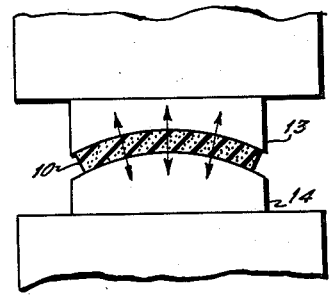
FIGURE 3 is a diagrammatic view similar to FIGURE 2 but showing the slab of magnetic material being compressed between the die halves to form a curved ring segment.
Figure 4:
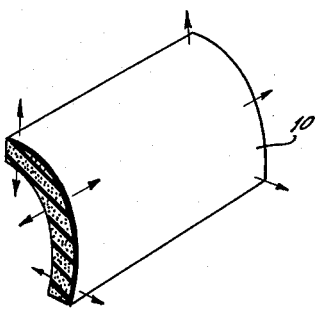
FIGURE 4 is a diagrammatic view showing a finished ring segment.

One technique whereby curved magnets may be produced is shown in FIGURES 2, 3 and 4 of the drawing. A thick slab 10 of material which has been treated in accordance with the process of this invention is placed between the platens 11 and 12 of a press. Platen 11 is provided with a concave die 13, and platen 12 is provided with a convex die 14 adapted to cooperate with die 13. When the press is actuated, the dies 13 and 14 are brought together, causing the material 10 to conform to the curvature of the space between them, as shown in FIGURE 3. By reason of its improved flexibility the slab 10 will not crack as it is bent into curved form. Moreover, if the material 10 is of the type which is magnetically aligned in the direction perpendicular to its surface, as illustrated by the arrows in FIGURE 2, the curved ring segment will display radial alignment, as shown diagrammatically by the arrows in FIGURES 3 and 4. The slab is recured or set in curved form by subjecting it to elevated temperatures and pressures, in accordance with conventional curing technique. A completed ring segment is shown in FIGURE 4, and shows no evidence of cracking or breaking, and has a smooth, shiny surface.

While I have described the preferred embodiment of my invention, it will be appreciated that I do not desire to be limited to that embodiment alone, but rather contemplate modifications and variations thereof in accordance with the claims which follow.

Having described my invention, I claim:

1. In the process of manufacturing permanent magnet material by mixing finely divided particles of a permanent magnet substance with a rubber matrix, said particles comprising the major portion by weight of the resulting mixture, working the mixture into relatively thin elongated form, and curing the rubber matrix, the additional step which comprises, subjecting the material to rolling between spaced rolls after said rubber matrix has been cured, the spacing between said rolls being not more than about 95% of the thickness of the material, whereby the integration of said material is improved.

2. The process of claim 1 wherein said material comprises at least 75% by weight of finely divided particles of permanent magnet substance.

3. The process of claim 1 wherein said material is rolled a number of times between said rolls after said rubber matrix has been cured.

4. The process of claim 1 wherein said substance is a ferrite and said particles are of the approximate order of 5 microns in size and comprise about 90% by weight of said material.

5. The process of claim 1 wherein the spacing between said rolls is about 95% of the thickness of said material.

6. In the process of manufacturing permanent magnet material by mixing finely divided particles of a permanent magnet substance with a non-magnetic matrix selected from the class consisting of rubber, elastomers, and elastomeric plastics, said particles comprising the major portion by weight of the resulting mixture, working the mixture into relatively thin, elongated form, and curing the material, the additional step which comprises, subjecting the material to rolling between spaced rolls after said curing, the spacing between said rolls being not more than about 95% of the thickness of said strip, whereby the flexibility of said material is improved.

7. In the process of manufacturing permanent magnet material by dispersing fine particles of a permanent magnet substance with an elastomeric bonding matrix, said particles comprising the major portion by weight of the resulting material, working the material into flat sheet form, and curing the material, the additional steps comprising, subjecting the flat cured material to rolling between rolls the spacing between which is not more than about 95% of the thickness of said material, whereby the flexibility of said flat material is improved and said flat material is rendered able to be bent without cracking, pressing said material between opposed curved dies to a predetermined radius of curvature, and further curing said material at elevated conditions of temperature and pressure while maintaining said material in said curved shape.

8. In the process of manufacturing permanent magnet material by dispersing fine magnetically anistropic particles in an elastomeric curable matrix, said particles comprising the major portion by weight of the resulting material, working the material into sheet form wherein the sheet displays a preferred direction of magnetization perpendicular to its surface, and curing the matrix of the material, the additional steps which comprise, subjecting the cured material to rolling between rolls the spacing between which is not more than about 95% of the thickness of said strip, whereby the integration of said material is improved and whereby the flexibility of said material is substantially improved so that said material can be bent without breaking, pressing said material to a predetermined curvature between cooperating curved dies the direction of alignment of said material extending radially thereto as said material is curved, and then further curing said material.

References Cited in the file of this patent

UNITED STATES PATENTS

| | | |
|---|---|---|
| 2,231,769 | Merril | Feb. 11, 1941 |
| 2,532,876 | Asche et al. | Dec. 5, 1950 |
| 2,723,356 | Macleod | Oct. 25, 1955 |
| 2,849,312 | Peterman | Aug. 26, 1958 |